United States Patent
Egri et al.

(10) Patent No.: US 11,528,189 B1
(45) Date of Patent: Dec. 13, 2022

(54) NETWORK DEVICE IDENTIFICATION AND CATEGORIZATION USING BEHAVIORAL FINGERPRINTS

(71) Applicant: Cujo LLC, Walnut, CA (US)

(72) Inventors: Attila Egri, Halasztelek (HU); Christian Kiss-Toth, Budapest (HU); Matteo Cafasso, Helsinki (FI)

(73) Assignee: Cujo LLC, Walnut, CA (US)

( * ) Notice: Subject to any disclaimer, the term of this patent is extended or adjusted under 35 U.S.C. 154(b) by 0 days.

(21) Appl. No.: 17/689,301

(22) Filed: Mar. 8, 2022

(51) Int. Cl.
| | |
|---|---|
| *G06F 15/173* | (2006.01) |
| *H04L 41/085* | (2022.01) |
| *H04L 43/065* | (2022.01) |
| *H04L 41/12* | (2022.01) |
| *H04L 41/0893* | (2022.01) |

(52) U.S. Cl.
CPC ........ *H04L 41/085* (2013.01); *H04L 41/0893* (2013.01); *H04L 41/12* (2013.01); *H04L 43/065* (2013.01)

(58) Field of Classification Search
CPC .... H04L 41/085; H04L 41/0893; H04L 41/12
USPC ........................................................ 709/224
See application file for complete search history.

(56) References Cited

U.S. PATENT DOCUMENTS

| | | | |
|---|---|---|---|
| 2016/0019296 A1* | 1/2016 | Sullivan | G06F 21/44 707/770 |
| 2018/0032584 A1* | 2/2018 | Singh | G06F 7/08 |
| 2020/0007395 A1* | 1/2020 | Fainberg | H04L 41/0213 |
| 2020/0067777 A1* | 2/2020 | Tandel | H04L 63/1408 |
| 2020/0195508 A1* | 6/2020 | Benjamin | H04L 45/122 |
| 2021/0335505 A1* | 10/2021 | Tedaldi | G06K 9/6282 |
| 2021/0367847 A1* | 11/2021 | Vasseur | H04L 43/10 |
| 2022/0247630 A1* | 8/2022 | Engi | H04L 41/0627 |

* cited by examiner

*Primary Examiner* — Hee Soo Kim
(74) *Attorney, Agent, or Firm* — Dority & Manning, P.A.

(57) ABSTRACT

Network device identification is disclosed. A set of data attributes relating to at least two different data types is extracted from network traffic data associated with each user device of a set of user devices. A cluster data set of one or more known device clusters is expanded with the set of data attributes for generating an expanded cluster data set. One or more new device clusters is identified from the expanded cluster data set of the one or more known device clusters by using similarity-based metrics and a weighting factor selected based on the data types of the set of data attributes, and one or more device identification rules is generated based on the one or more new device clusters.

20 Claims, 3 Drawing Sheets

NETWORK DEVICE IDENTIFICATION AND CATEGORIZATION USING BEHAVIORAL FINGERPRINTS

TECHNICAL FIELD

The present application relates generally to network security.

BACKGROUND

It can be desirable to identify network devices in a computer network to enable, for example, controlling access to computer networks or services, applying required communication policies, and/or preventing and monitoring unauthorized access.

SUMMARY

According to an aspect of the invention there is provided a method as specified in claim 1.

According to other aspect of the invention, there is provided an apparatus in a computer network system as specified in claim 11.

According to other aspect of the invention, there is provided a non-transitory computer-readable medium comprising stored program code, the program code comprised of computer-executable instructions that, when executed by a processor, causes the processor to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
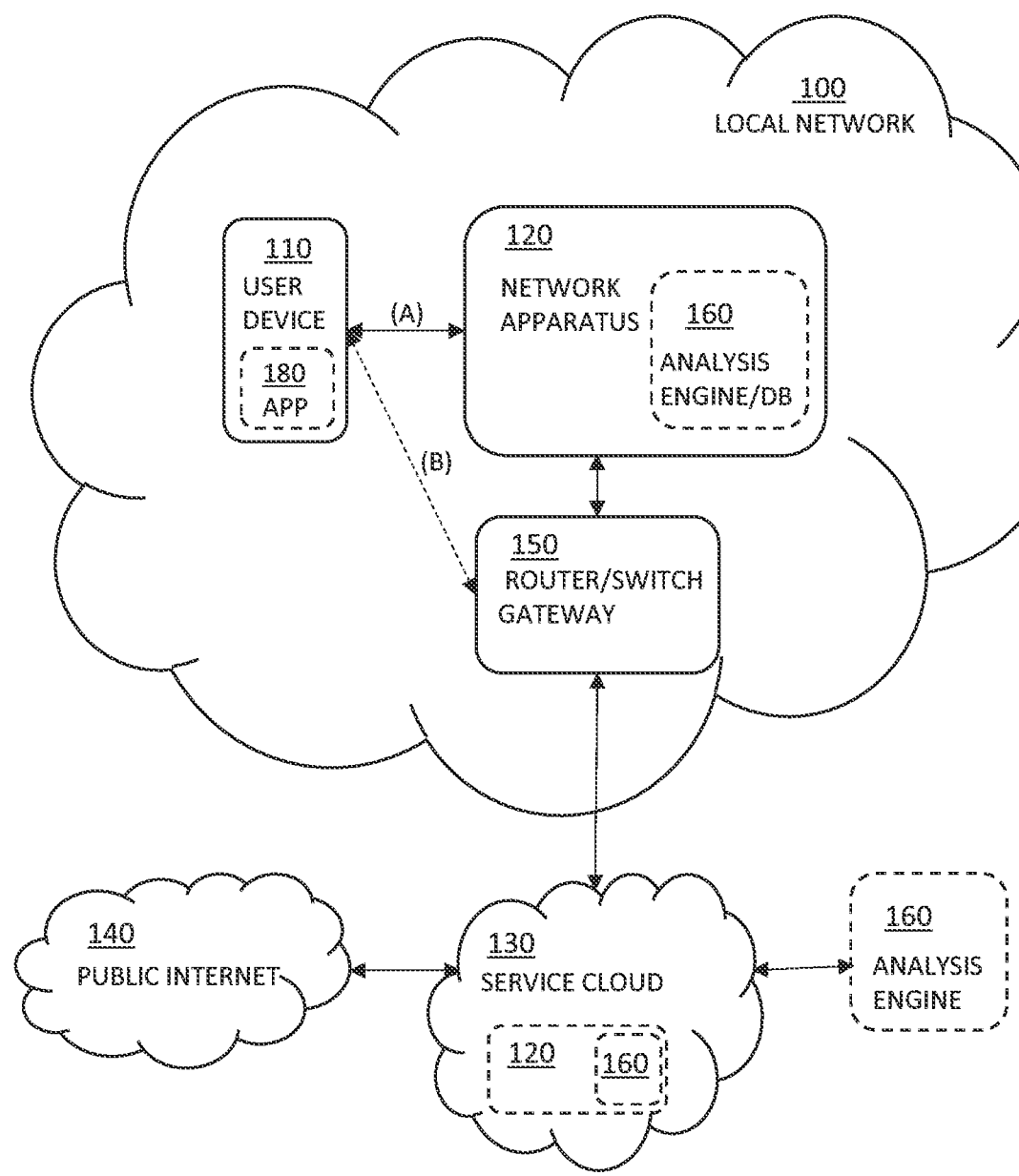
FIG. 1 illustrates an example system environment for a network apparatus in a computer network system.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

It can be desirable to identify network devices in a computer network to enable, for example, controlling access to computer networks or services, applying required communication policies, and/or preventing and monitoring unauthorized access. This requires the capability to identify and categorize customer network devices that are connected to a customer-premise equipment (CPE) of a network service provider (NSP). Network devices may be identified based on the behaviour they exhibit over the network during their normal operation. This behaviour may be represented by various data points extracted from different network protocols, such as MAC derived vendors, dynamic host configuration protocol (DHCP) hostnames, user agents, simple service discovery protocol (SSDP) headers and responses and multicast domain name system (mDNS) headers, for example. Each network device shows a distinct combination of data points that can be used as a behavioural fingerprint associated to that network device. These fingerprints can be used to uniquely identify the network devices themselves as well as to understand specific characteristics such as a brand, a model and a running software of the network device, for example. Device fingerprint can be information related to a device for the purpose of identification.

One example of a device intelligence fingerprint service is a knowledge engine composed by a set of heuristics capable of identifying and categorizing network devices based on their behavioural fingerprints. Such heuristics can be maintained in form of device identification rules. For example, each network device can be identified and categorized based on a set of device identification rules which define the fingerprints that the network device generates over the network. Continued updates on these heuristics are required in order to be able to detect any new network devices that are entering the market. As one example, a fingerprinting information chart generated for a mobile phone is illustrated in Table 1 which shows a device identification rule comprising the data types Vendor and Hostname, and a fingerprint of "Nokia® John-nokia-phone" for a particular mobile phone network device.

TABLE 1

Example fingerprinting information chart for a mobile phone

| Data type | Value |
| --- | --- |
| Vendor | Nokia (RTM) |
| Hostname | John-nokia-phone |

When a new network device enters the market, new behaviour can be observed over the network. This behaviour is yet unknown to the device intelligence fingerprinting service. Thus, new device may not be detected properly. Generic heuristics will be able to provide some hints on the nature of the device but will most likely fail to provide a detailed description.

For example, if the device intelligence fingerprinting service would organize its heuristics in different levels between 0 to 10, then usually a new network device might be identified as, for example, a generic phone and be assigned a low level such as a 4. On the other hand, if the behavioural fingerprints of a specific device would be well known, it could be categorized as a level 10. This type of criteria may be used when trying to identify devices that are not yet well known to the device intelligence fingerprinting service, and this also requires trying to identify their behavioural fingerprints manually. This process requires a fair amount of time per each new device and consists also identifying recurring patters between different devices. These patterns or keywords are used to cluster unknown devices together. Once a cluster sharing common pattern is identified, investigations over the nature of the device can be started. This can be carried out through Internet search engines, for example. A lot of effort is spent in grouping devices together for enabling finding the behavioural commonalities between the devices that can be used as fingerprints.

Thus, there is a need for automated techniques for identifying new devices in computer networks. There is also a need to automate the grouping or clustering processes to avoid the need to do it manually and for generating a list of devices deemed to be similar in nature based on their behaviour.

FIG. 1 illustrates schematically an example of a system environment for a network apparatus 120. The system environment illustrated in FIG. 1 includes a computer network 100, such as a local network, that may include one or more computer devices 110, sometimes referred to herein as user devices 110, the network apparatus 120, a local router/switch 150, and an analysis engine and a database 160. The computer devices 110 may also comprise any number of client applications 180; however, this is not required. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smart phone, a laptop, or a tablet having a network interface and an ability to connect to the network apparatus 120 and/or the local network router 150 with it. The network apparatus 120 collects information (e.g., about the computer network 100) including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the Internet 140 or computer network 100. In some embodiments, the device 110 executes an application (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. At least part of these devices are connected to the Internet 140, for example, via one or more Wi-Fi access points.

Embodiments of the present invention overcome the drawbacks of the previous solutions by applying new capabilities and methods targeted to enable identification of devices based on different types of network information and enable also reducing the amount of time needed for identifying new devices or updating behavioural fingerprints.

Clustering is often used to assist in analyzing the network information related to the network devices and machine learning. As used herein, clustering refers to the task of grouping network devices in a way that the devices in the same cluster are more similar to each other than to those in other clusters. Embodiments of the present invention can not only identify completely new device clusters but can also find similarities from known clusters. Thus, it enables detecting new behavioural fingerprints for faster and/or more reliable device identification. Further, by further refining the device clustering criteria, it is in fact possible to provide enhanced grouping rules for improving fingerprinting performance and reducing false positives. For example, two models belonging to a same family of devices will show subtle behavioural differences which may be hard to detect for a human analyst but would become evident when applying a clustering criteria as two distinct clusters would form.

Figure 2:
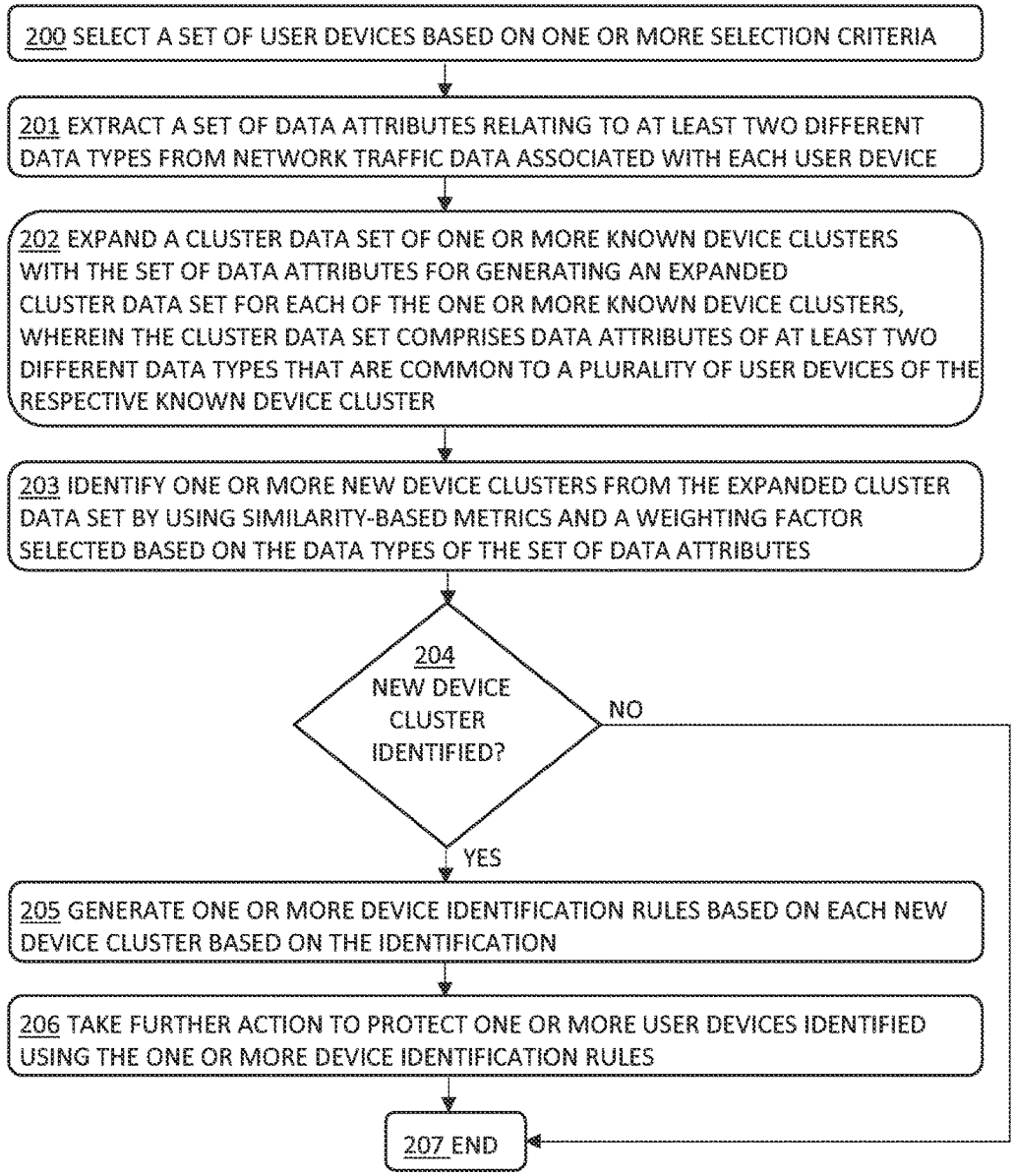
FIG. 2 illustrates an example method, according to one embodiment.

FIG. 2 is a flow diagram illustrating an embodiment of a method.

In 200, a set of user devices in a computer network is selected based on one or more selection criteria.

In 201, a set of data attributes relating to at least two different data types are extracted from network traffic data associated with each user device of the set of user devices.

In 202, a cluster data set of one or more known device clusters is expanded with the extracted set of data attributes for generating an expanded cluster data set for each of the one or more known device clusters. The cluster data set comprises data attributes of at least two different data types that are common to a plurality of user devices of the respective known device cluster.

In 203, one or more new device clusters are identified from the expanded cluster data set of the one or more known device clusters by using similarity-based metrics and a weighting factor selected based on the data types of the set of data attributes.

In 204, if no new device clusters are identified, then 208 is entered where the process ends. Further, in 204, in response to identifying one or more new device clusters, then 205 is entered where one or more device identification rules are generated based on the one or more new device clusters.

In 206, further action is taken to protect one or more user devices identified using the generated one or more device identification rules.

The process ends in 207.

In an embodiment, the one or more selection criteria is based on one or more of the following: detected low fingerprinting level of a user device, the size of data points collection for the set of user devices, a date associated with a data point, detected recent device software (e.g., operation system or firmware) update.

In an embodiment, extracting the set of data attributes further comprises analyzing, by one or more algorithms, available fingerprints and extracting relevant data based on the analysis.

In an embodiment, the set of data attributes are extracted by analysis using one or more of: static rules, data extraction algorithms and artificial intelligence applications.

In an embodiment, the one or more new device clusters are validated based on one or more of: a size of the one or more new device clusters, a similarity score based on data attribute distribution in the one or more new device clusters. The validation of the one or more new device clusters may be processed automatically and/or by a human analyst.

In an embodiment, the expanded cluster data set is processed by one or more of: a) selecting a first data attribute from a first data point of the expanded cluster data set, b) searching for a least two similar user devices having the first data attribute in the first data point, c) in response to finding no similar user devices with the first data attribute in the first data point, selecting one or more further data attributes from the first data point and searching for at least two similar user devices having the same one or more further data attributes in the first data point, d) in response to finding two or more similar user devices with the first data attribute and/or the one or more further data attributes in the first data point, searching one or more data attributes from a second data point related to the at least two similar user devices, e) repeating step d) for each respective data point and data attribute found, f) resizing the cluster data set of a known device cluster based on found similarities between the at least two similar user devices, g) validating the resized cluster data set of the known device cluster after identifying the one or more new device clusters, and h) using a clustering criteria that is based on the one or more new device clusters as a fingerprinting rule.

In an embodiment, the weighting factor is used to assign a lighter or a heavier importance to the first and/or the second data point.

In an embodiment, the data type associated with the set of data attributes comprises one or more of: a vendor name, a dynamic host configuration protocol (DHCP) hostname, a user agent, a simple service discovery protocol (SSDP) header and/or response, a multicast DNS header.

In an embodiment, the one or more device identification rules are used for identifying one or more similar user devices.

In an embodiment, a similarity metric as used herein, can be a real-valued function that quantifies the similarity between the data attributes of a potential new device cluster. Similarity is an amount that refers to the strength of relationships representing how similar the data patterns in a device cluster are.

Figure 3:
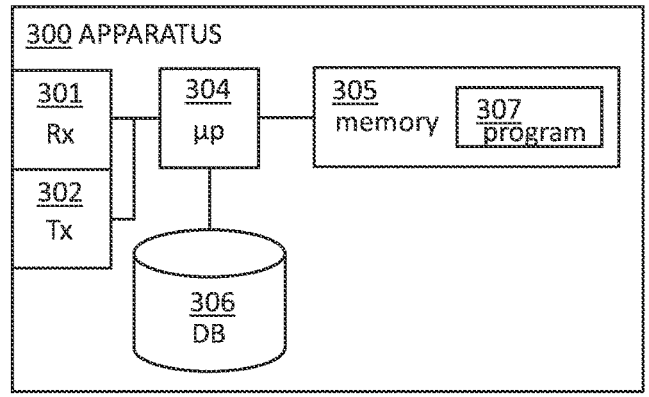
FIG. 3 is a block diagram of an apparatus, according to one embodiment.

Turning now to FIG. 3 that is showing an example of a network apparatus such as a router, a switch, a 5G modem, or other network level apparatus.

A processor 304 is provided that is configured to identify devices in the monitored computer network. The processor 304 is configured to select a set of user device based on one or more selection criteria. The processor 304 is further configured to extract, from network traffic data associated with each user device of the set of user devices, a set of data attributes relating to at least two different data types. The processor 304 is further configured to expand a cluster data set of one or more known device clusters with the extracted set of data attributes for generating an expanded cluster data set for each of the one or more known device cluster, wherein the cluster data set comprises data attributes of at least two different data types that are common to a plurality of user devices of the respective known device cluster. The processor 304 is further configured to identify one or more new device clusters from the expanded cluster data set by using similarity-based metrics and a weighting factor selected based on the data types of the set of data attributes. The processor 304 is further configured to generate one or more device identification rules based on the one or more new device clusters identified.

In an embodiment, the processor 304 is configured to store data such as any network-based identification data, metadata, attributes, values, MAC addresses, hostnames as well as other data related to connection requests, state information and/or domain data to the database 306. The database 306 is shown in this example as being located at the apparatus 300, but it will be appreciated that the apparatus 300 may alternatively access a remote database. The database 306 may comprise necessary data collected from user devices.

The apparatus 300 is provided with a receiver 301. A transmitter 302 is also provided for communication with the computer device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processor.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all the functions of the method can be implemented in any apparatus, for example any user device or a server.

The embodiments of the invention are based upon the attempt to automate the grouping or clustering process such a way that manual processing the process is not required. An embodiment of the invention may provide a list of network devices deemed to be similar in nature based on their behaviour. Thus, at the same time as a new cluster is identified, the similarities between the network devices of the new cluster are provided that can be used as a guidance when generating behavioural fingerprints for those network devices. It may also be required to define different categories to associate with the specific network devices such as a type, a brand, a name, a level, etc.

Figure 4:
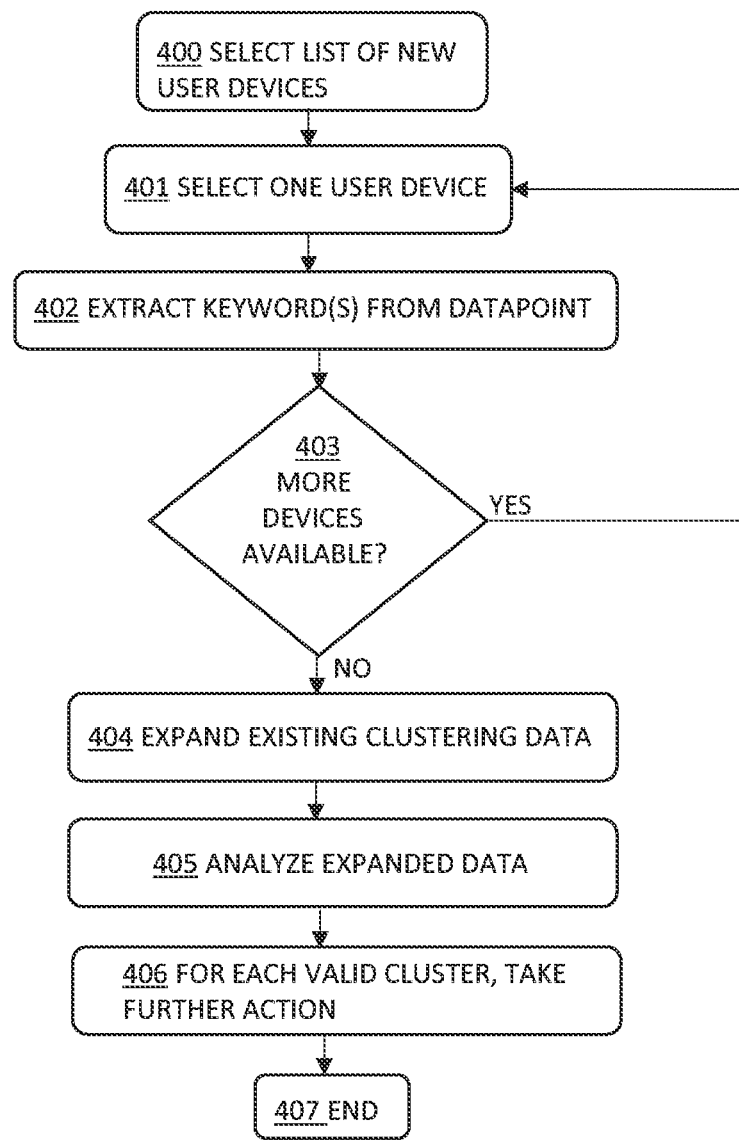
FIG. 4 illustrates an example process, according to one embodiment.

FIG. 4 is a flow diagram illustrating an example embodiment of a method.

An automated process according to an embodiment of the invention may comprise one or more of the following process steps wherein in 400, a list of new user devices is selected, for example, by using a selection criteria. In 401, one of the user devices in the list is selected. In 402, a set of keywords/data attributes from different datatypes (e.g., MDNS, vendor, SSDP_RESPONSE) is extracted from a datapoint. The extraction of the keywords/data attributes can be made per each device. In 403, in response to detecting more user devices, 401 is re-entered; another user device is selected; and keyword(s) are extracted from the datapoint related to the selected user device (402). In response to detecting that no more user devices are available in 403, 404 is entered where existing/previously known clustering data is expanded with the newly extracted keywords/data attributes. In 405, the expanded clustering data is analyzed. In response to identifying a new device cluster based on the analysis of the expanded clustering data, then further action may be taken for each valid new cluster that has been identified in 406. Validation of the results can be based on a predetermined criteria. In some embodiments, the results of the analysis can also be forwarded to a human analyst for validation. In some embodiments, in response to each possible new device cluster that is deemed valid based on the predetermined criteria, it can be forwarded to a device intelligence research team for evaluation, for example.

In an embodiment, the selection criteria for selecting the set of user devices can be based on a combination of factors such as a low fingerprinting level (e.g., 0 to 6), the size of the data points collection for the given devices and/or the date associated with the data points etc. A particular interest may be given to user devices that have had recent software, such as firmware, updates since this could indicate potential changes in their behaviour. Thus, the selection criteria for selecting the set of user devices may also be based on detecting recent software updates in the user devices.

In an embodiment, the keyword extraction process may comprise using a specific algorithm to analyze any available fingerprints and extracting useful information depending on its type. The extracted data may then be further analyzed by simple routines or machine learning models to eliminate non-relevant information.

In an embodiment, the keyword extraction is based on pre-processing the data in order to understand which bits of the data is important and will not be modified. Thus, user device behavioural data is relied on but only specific portions of it. Generally, a fingerprint is extracted and depending on its type, specific portion(s) of it is selected and the selection portions/parts are kept as is.

In an embodiment, it is possible to keep the whole fingerprint (such as the DHCP hostname) or to select the content of different tags in an extensible markup language (XML) document (such a simple service discovery protocol (SSDP) response) or to pick selected values from dictionaries (such as mDNS) or to select a particular section of the fingerprint, for example, based on the character positions or presence of a particular word of interest.

In an embodiment, basically for any kind of fingerprint or in general for any kind of data, an appropriate extraction process can be defined. This extraction process may be a major part of the algorithm since if useless parts of the original data would be kept, the clustering efforts could provide potentially meaningless results.

In an embodiment, the device cluster identification is based on at least two types of keywords/data types. This is because a good, high level device cluster is made of at least two attributes or two types of keywords. For example, the vendor name is usually available and having only one additional attribute has the advantage of using less resources during the device identification process. Thus, a typical device cluster can be created by using a vendor name and one additional attribute. This other attribute must be identical among the devices in a device cluster, but it can happen that a vendor takes more than one different value (e.g., it is common that a specific mobile device has more than one vendor values, i.e., vendor names). Table 2 shows an example where two attributes (user-agent and vendor) is used but the other attribute has more than one different values. In this example, most of the vendor names are valued Mobile A1 but there are also hits for Mobile A2 and A3.

TABLE 2

Example of data attributes and corresponding values

| Data attribute/type | Value | | |
|---|---|---|---|
| User-agent | SM-710A | | |
| Vendor name | Mobile A1 | Mobile A2 | A3 |

In an embodiment, a certain amount of noise may be accepted due to potential data collection imperfections. For device identification, speed is critical. Certain type of data arrives sooner than others for a device and also some data can be missing. Thus, it is necessary to have more than one behavioural fingerprint for a device cluster or otherwise a device cluster identification should be based on more than two attributes. This can conclude in high level clusters such as shown in the example of Table 3.

TABLE 3

Example high level device cluster data attributes

| Data attribute/type | Value |
|---|---|
| SSDP | LS32AM702UNXZA |
| mDNS | M70A |
| Vendor name | Mobile A1 |

In this case, two separate rules can be created for identifying the same device. However, in case of lower-level device clusters, the device identification may be based on detecting that certain types of datapoints are a subset of another one as shown in example of Table 4.

TABLE 4

Example lower-level device cluster data attributes

| Data attribute/type | Value | | |
|---|---|---|---|
| SSDP | QN75Q60TBFXZA | QN55Q60TBFZZA | QN65Q60TBFXZA |
| mDNS | | QTQ62 | |
| Vendor name | Mobile A1 | Mobile A1 | Mobile A1 |

In an embodiment, in the appending phase, the previously identified or known device clusters are expanded with the newly extracted data. This step is important since each device cluster should contain a predetermined number of elements to be considered as valid. When a device cluster is fully analyzed and its usefulness is decided, it is then removed from any further processing.

In this case, the device cluster identified by the mDNS data attribute (keyword) reaches only a lower level, but it provides information early after device connection (mDNS usually appears in the first 3 minutes from the start of connection while SSDP is typically sent after 2 hours), and even in the absence of SSDP. In an embodiment, 0 the device cluster identification can be done by using a set-comparing metrics, such a Jaccard-index, pairwise.

Similarity measure using similarity-based metrics for smart televisions—example use case scenario In order to define similarity, an understanding of how model numbers are structured is needed. Let's start with an example model number: QN65Q800TAFXZA, where Q: Denotes the type of the panel (QLED, LED, etc)

N: Area, where the device is sold (North America, Europe, etc)

65: Size of the panel in inches

Q800T: specific model of the television

A: Generation of the tv (typically first or second, denoted by A or B)

F: Tuner type (ATSC, DVB, etc)

X: Design code (Usually X is used)

ZA: Country of manufacture (USA, Russia, etc)

In order to measure closeness of different keywords this structure should be considered, for example, in the following way: for a lower level identification only the Q800T part is considered with a weight (weighting factor) 1 while other parts have zero weights. Hence, in this case, the similarity of two keywords are measured by the number of equal characters in position 5-9 divided by the length of the part.

For example: sim_low/(QN65Q800TAFXZA, QN55Q800TAUXXU)=5/5=1. Here 1 means that by this similarity they are equivalent. It should be noted that this implies that the two devices are of the same model but can have different sizes or different designs, for example.

For higher level identification, other parts of the keywords are considered as well. This means that a panel type, size and a model number may get a weight of 1, while generation and design code gets a weight of 0.5. Other parameters are not relevant for device clustering. Similarity is again measured by the ratio of equal characters (with weights), except for the size parameters that either gets a 0 or a 1 value denoting complete identity of the two sizes.

For example: sim_high(QN65Q800TAFXZA, QN55Q800TAUXXU)=((1+0+5)*1+(1+1)*0.5)/(7*1+ 2*0.5)=0.875. In practical implementations, these two similarities are combined together and normalized in a way to reflect a low level equality above 0.5, and a high level above 0.9 independently of the device type and vendor.

In an embodiment, the criteria for validating whether a device cluster is a good one can be based on a combination of factors such as the device cluster sizes or a similarity score based on keyword distribution in the proposed new device cluster. In an embodiment, after a human analyst decision, a feedback score can be used for training the algorithm in later validation purposes.

In an embodiment, the process can be entirely automated which significantly reduces the amount of time needed for manual work for finding new devices and/or updating behavioural fingerprints.

In an embodiment, the algorithm(s) used in the process is not only capable of identifying completely new device clusters, but can also find similarities with existing device clusters. Thus, it can detect new behavioural fingerprints for faster and more reliable device identification.

In an embodiment, it is possible to provide improved grouping rules that improve fingerprinting performance and reduces false positives by further refining the clustering criteria. For example, two models belonging to a same family (e.g., Mobile A1 and Mobile A1 Plus) may show subtle behavioral differences that may be hard to detect for a human analyst but would become evident when applying the clustering criteria as two distinct clusters would form.

In addition to using the embodiments of the invention for identification of new/unknown devices, it can also be used for already known devices in case already existing heuristics require validation or improving. For example, it is possible to determine that there are two submodels of a specific mobile phone brand when the algorithm produces two distinct (but similar) device clusters. In an embodiment, previous models for device identifying are improved by exploring the population of the user devices for detecting similarities across the user devices and behavioural types. This is possible even without any prior knowledge related to other models since it is device intelligence agnostic and can work without any support from any device intelligence knowledge base.

The embodiments of the invention also work on any kind of connected devices including not only IoT devices but also smartphones, personal computers, laptops and industrial devices. In embodiments of the invention, features are extracted from the network behaviour of the devices and are thus applicable in real world use cases. In an embodiment, different importance is given to various data points that are analyzed based on selected criteria(s) such as based on data point type and the keyword(s) extracted from the data point. For example, a keyword extracted from a mDNS payload may be considered to be more relevant than a DNS request value would be. Further, a longer and more specific keyword can have a higher value than a shorter keyword. In an embodiment, a set of clustering criteria is defined based on the behavioural similarities that are detected between different devices of a same type/brand/model. In an embodiment, a union upon the values (extracted keywords) of such data points can be computed. In an embodiment, only a specific part (data attributes/keywords) of the network traffic data associated with each user device is required for the method to work.

In an embodiment, the methodology used is data attribute (keyword) agnostic from a theoretical point of view. In an embodiment, the process steps may be implemented by: 1) finding what is considered to be a relevant keyword for a data point (e.g., SSDP), and 2) searching similar user devices with that keyword in the same data point (SSDP). If none found, returning to step 1, 3) searching relevant keyword from other data point related to the same devices (e.g., DHCP hostname) and cycling this for each data point and keyword found (multiple keywords can be found in the same data point), 4) resizing the device cluster data set based on the found similarities, 5) validating the device cluster, and 6) using the clustering criteria as a fingerprinting rule.

It will be appreciated that various modifications may be made to the above-described embodiments without departing from the scope of the present invention. For example, the database or analysis engine may be in separate entities to the apparatus, in which case the apparatus will send queries remotely to the analysis engine The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for selecting a set of user devices in a computer network based on one or more selection criteria and a code for extracting, from network traffic data associated with each user device of the set of user devices, a set of data attributes relating to at least two different data types. The computer program code further comprises a code for expanding a cluster data set of one or more known device clusters with the extracted set of data attributes for generating an expanded cluster data set for each of the one or more known device clusters, wherein the cluster data set comprises data attributes of at least two different data types that are common to a plurality of user devices of the respective known device cluster, a code for identifying one or more new device clusters from the expanded cluster data set of the one or more known device clusters by using similarity-based metrics and a weighting factor selected based on the data types of the set of data attributes, and a code for generating one or more device identification rules based on the one or more new device clusters identified.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   selecting a set of user devices in a computer network based on one or more selection criteria;
   extracting, from network traffic data associated with each user device of the set of user devices, a set of data attributes relating to at least two different data types;
   expanding a cluster data set of one or more known device clusters with the set of data attributes for generating an expanded cluster data set for each of the one or more known device clusters, wherein the cluster data set comprises data attributes of at least two different data types that are common to a plurality of user devices of the respective known device cluster;
   identifying one or more new device clusters from the expanded cluster data set of the one or more known device clusters by using similarity-based metrics and a weighting factor selected based on the data types of the set of data attributes; and
   generating one or more device identification rules based on the one or more new device clusters.

2. The method according to claim 1, wherein the one or more selection criteria is based on one or more of: detected low fingerprinting level of a user device, size of data points collection for the set of user devices, a date associated with a data point, and detected recent device software update.

3. The method according to claim 1, wherein extracting the set of data attributes further comprises: analyzing, by one or more algorithms, available fingerprints and extracting relevant data based on the analysis.

4. The method according to claim 1, wherein extracting the set of data attributes by analysis comprises analyzing a data point associated with each user device using one or more of: static rules, data extraction algorithms, and artificial intelligence applications.

5. The method according to claim 1, further comprising: validating the one or more new device clusters based on one or more of: a size of the one or more new device clusters, and a similarity score based on data attribute distribution in the one or more new device clusters.

6. The method according to claim 5, wherein validating the one or more new device clusters is processed automatically and/or by a human analyst.

7. The method according to claim 1, further comprising processing the expanded cluster data set by one or more of:
   a) selecting a first data attribute from a first data point of the expanded cluster data set;
   b) searching for at least two similar user devices having the first data attribute in the first data point;
   c) in response to finding no similar user devices with the first data attribute in the first data point, selecting one or more further data attributes from the first data point and searching for at least two similar user devices having the same one or more further data attributes in the first data point;
   d) in response to finding two or more similar user devices with the first data attribute and/or the one or more further data attributes in the first data point, searching one or more data attributes from a second data point related to the at least two similar user devices;
   e) repeating step d) for each respective data point and data attribute found;
   f) resizing the cluster data set of a known device cluster based on similarities between the at least two similar user devices;
   g) validating the cluster data set of the known device cluster after identifying the one or more new device clusters; and
   h) using a clustering criteria that is based on the one or more new device clusters as a fingerprinting rule.

8. The method according to claim 7, wherein the weighting factor is used to assign a lighter importance or a heavier importance to the first data point and/or the second data point.

9. The method according to claim 1, wherein at least one of the at least two different data types associated with the set of data attributes comprises one or more of: a vendor name, a dynamic host configuration protocol (DHCP) hostname, a user agent, a simple service discovery protocol (SSDP) header and/or SSDP response, and a multicast DNS header.

10. The method according to claim 1, further comprising using the one or more device identification rules for identifying a similar user device.

11. An apparatus in a computer network system comprising one or more processor devices, the one or more processor devices configured to:
   select a set of user devices in a computer network based on one or more selection criteria;
   extract, from network traffic data associated with each user device of the set of user devices, a set of data attributes relating to at least two different data types;
   expand a cluster data set of one or more known device clusters with the set of data attributes for generating an expanded cluster data set for each of the one or more known device clusters, wherein the cluster data set comprises data attributes of at least two different data types that are common to a plurality of user devices of the respective known device cluster;
   identify one or more new device clusters from the expanded cluster data set of the one or more known device clusters by using similarity-based metrics and a weighting factor selected based on the data types of the set of data attributes; and
   generate one or more device identification rules based on the one or more new device clusters.

12. The apparatus according to claim 11, wherein the one or more selection criteria is based on one or more of: detected low fingerprinting level of a user device, size of data points collection for the set of user devices, a date associated with a data point, and detected recent device software update.

13. The apparatus according to claim 11, wherein, to extract the set of data attributes, the one or more processor devices are further configured to analyze, by one or more algorithms, available fingerprints and extract relevant data based on the analysis.

14. The apparatus according to claim 11, wherein, to extract the set of data attributes, the one or more processor devices are further configured to analyze by using one or more of: static rules, data extraction algorithms, and artificial intelligence applications.

15. The apparatus according to claim 11, wherein the one or more processor devices are further configured to validate the one or more new device clusters based on one or more of: a size of the one or more new device clusters, and a similarity score based on data attribute distribution in the one or more new device clusters.

16. The apparatus according to claim 11, wherein the one or more processor devices are further configured to process the expanded cluster data set by one or more of:
   a) selecting a first data attribute from a first data point of the expanded cluster data set;
   b) searching for at least two similar user devices having the first data attribute in the first data point;
   c) in response to finding no similar user devices with the first data attribute in the first data point, selecting one or more further data attributes from the first data point and searching for at least two similar user devices having the same one or more further data attributes in the first data point;
   d) in response to finding two or more similar user devices with the first data attribute and/or the one or more further data attributes in the first data point, searching one or more second data attributes from a second data point related to the at least two similar user devices;
   e) repeating step d) for each respective data point and data attribute found;
   f) resizing the cluster data set of a known device cluster based on similarities between the at least two similar user devices;
   g) validating the cluster data set of the known device cluster after identifying the one or more new device clusters; and
   h) using a clustering criteria that is based on the one or more new device clusters as a fingerprinting rule.

17. The apparatus according to claim 16, wherein the weighting factor is used to assign a lighter importance or a heavier importance to the first data point and/or the second data point.

18. The apparatus according to claim 11, wherein the data type associated with the set of data attributes comprises one or more of: a vendor name, a dynamic host configuration protocol (DHCP) hostname, a user agent, a simple service discovery protocol (SSDP) header and/or SSDP response, and a multicast DNS header.

19. The apparatus according to claim 11, wherein the one or more processor devices are further configured to use the one or more device identification rules for identifying a similar user device.

20. A non-transitory computer-readable medium comprising stored program code, the program code comprising computer-executable instructions that, when executed by a processor, causes one or more processor devices to:
   select a set of user devices in a computer network based on one or more selection criteria;
   extract, from network traffic data associated with each user device of the set of user devices, a set of data attributes relating to at least two different data types;
   expand a cluster data set of one or more known device clusters with the set of data attributes for generating an expanded cluster data set for each of the one or more known device clusters, wherein the cluster data set comprises data attributes of at least two different data types that are common to a plurality of user devices of the respective known device cluster;
   identify one or more new device clusters from the expanded cluster data set of the one or more known device clusters by using similarity-based metrics and a weighting factor selected based on the data types of the set of data attributes; and
   generate one or more device identification rules based on the one or more new device clusters.

* * * * *